United States Patent [19]

Campbell et al.

[11] 4,336,583
[45] Jun. 22, 1982

[54] CONTROLLED INDUCTIVE STORAGE DC-TO-DC CONVERTER

[75] Inventors: Stephen J. Campbell, Needham; Warren E. Hambly, West Bridgewater; George C. Harrison, Chelmsford, all of Mass.

[73] Assignee: Polaroid Corporation, Cambridge, Mass.

[21] Appl. No.: 216,132

[22] Filed: Dec. 15, 1980

[51] Int. Cl.³ .......................................... H02M 3/335
[52] U.S. Cl. ...................................... 363/21; 363/56; 363/97
[58] Field of Search ................................... 363/18–21, 363/56, 97, 98

[56] References Cited

U.S. PATENT DOCUMENTS

| | | | |
|---|---|---|---|
| 3,302,130 | 1/1967 | Minks | 363/18 X |
| 3,541,420 | 11/1970 | Rees | 320/1 |
| 3,564,393 | 2/1971 | Williamson | 363/21 X |
| 3,771,012 | 11/1973 | Niederjohn | 315/86 |
| 3,810,212 | 5/1974 | Biber | 354/128 |
| 3,840,797 | 10/1974 | Aggen et al. | 363/21 |
| 3,849,716 | 11/1974 | de Bergh et al. | 363/19 |
| 3,859,563 | 1/1975 | Vogt | 315/241 P |
| 4,070,699 | 1/1978 | Einbinder | 363/20 X |
| 4,071,884 | 1/1978 | Maigret | 363/21 |
| 4,104,714 | 8/1978 | Smith et al. | 363/21 |
| 4,133,025 | 1/1979 | Wurzburg | 363/97 X |
| 4,272,806 | 6/1981 | Metzger | 363/21 |

FOREIGN PATENT DOCUMENTS

52-41829  3/1977  Japan ........................ 363/97

Primary Examiner—A. D. Pellinen
Attorney, Agent, or Firm—Edward S. Roman

[57] ABSTRACT

A DC-to-DC converter charges a capacitor connected to the secondary of a transformer having a primary connected to a low-level power supply through an input control circuit which, when triggered, connects the power supply to the primary for only a predetermined time interval whereby current flows in the primary establishing a magnetic field that stores energy derived from the power supply. When the current in the primary is interrupted, the field collapses, inducing current to flow in the secondary thereby transferring energy from the field to the capacitor. The control circuit is triggered by a voltage sensor that detects the collapse of the field to zero. The voltage sensor includes a sensor inductively coupled to the magnetic field for developing a sensed voltage having a first level during collapse of the field and a second level after the field collapses to zero, the breakpoint between the levels defining the instant at which the field collapses to zero. A level detector detects the break point in the sensed voltage and triggers the control circuit.

15 Claims, 8 Drawing Figures

CONTROLLED INDUCTIVE STORAGE DC-TO-DC CONVERTER

TECHNICAL FIELD

This invention relates to a method of and apparatus for charging a capacitor from a low-level DC power supply using a DC-to-DC converter, and more particularly to a converter ideally suited for charging a storage capacitor associated with a flash tube mounted on a camera.

BACKGROUND ART

DC-to-DC converters for rapidly charging a capacitor from a low-level DC power supply are regularly used with cameras utilizing a gas discharge flash tube. Such converters must be highly reliable in addition to being small in size and low in cost. Additionally, they must be efficient and provide fast recycling time.

The electrical energy that must be stored in a capacitor prior to firing the flash tube depends on the parameters of the camera such as its lens and the film speed used with the camera, and on the maximum distance for flash photography, as well as the flash tube characteristics including reflector and tube designs. A relatively low value of electrical energy is five joules, and is typical for built-in strobes for many types of 35 mm cameras. For professional photography using larger cameras, 50 joules is a typical value for the electrical energy that must be stored in a capacitor. In converters of the type having an R-C controlled feedback oscillator, the oscillator runs at a predetermined frequency and its output is transformer-coupled to a rectifier that supplies current to the storage capacitor of the flash tube charging it to the desired level in a relatively short time. This technique is satisfactory for applications where battery power is readily available for driving the converter because feedback oscillation converters are inherently inefficient.

U.S. Pat. No. 3,541,420, granted Nov. 17, 1970, discloses one approach to improving the electrical efficiency of a DC-to-DC converter by providing a variable duty cycle driver circuit. In this patent, a transistor driver circuit is connected to the primary of a transformer across whose secondary is connected a capacitor to be charged, and the duty cycle of the transistor is controlled by a current sensor connected in the secondary of the transformer. The "on" time of the driver circuit is fixed for supplying a predetermined amount of energy to the magnetic field of the transformer. When the driver is turned off, the magnetic field collapses including current flow in the secondary of the transformer which is effective to transfer energy from the field to the capacitor. Current continues to flow in the secondary (i.e., the energy transfer process remains active) until the magnetic field collapses to zero. At that instant, secondary current flow terminates. The driver circuit remains "off" as long as the current sensor detects the presence of load current in the secondary. As soon as load current terminates (i.e., as soon as the energy transfer process is completed), a new cycle is initiated. In operation, the current sensor causes the duty cycle to vary inversely with the voltage on the capacitor; and the result is a converter having a slightly higher electrical efficiency than a conventional feedback oscillator type converter.

U.S. Pat. No. 4,104,714, granted Aug. 1, 1978, discloses a DC-to-DC converter that also minimizes transition losses. In this patent, operation of the driver circuit is controlled by the state of a flip-flop. A current sensor in the primary circuit controls the "on" time by sensing when the primary current reaches a predetermined limit below the saturation level of the transformer, and, in response, resetting the flip-flop to turn-off the driver transistor. The interruption of current in the primary causes the resultant magnetic field to begin to collapse thereby inducing a flow of current in the secondary which serves to charge the capacitor through a diode. The voltage across this diode is monitored and used to set the flip-flop when current flow through the diode terminates. The setting of the flip flop turns on the driver transistor and the cycle repeats.

In each of the two above identified patents, completion of the transfer of energy in the magnetic field of the transformer is sensed by determining the point at which the flow of current in the secondary reaches zero. Zero-point detection of current is difficult to achieve in practice because of the presence of noise; and as a consequence, some losses will be introduced in the event that the sensor arrangement utilized fails to detect the precise moment at which all of the energy contained in the magnetic field has been transferred to the capacitor. Generally, the losses involved are relatively small; but in an environment wherein the battery life is critical, the presence of such losses can result in marginal operation.

It is therefore an object of the present invention to provide a new and improved DC to DC converter wherein the above-referred to deficiencies in the prior art are substantially overcome or eliminated.

DISCLOSURE OF INVENTION

The present invention monitors the magnetic field of a converter transformer to detect completion of an energy transfer process from the field to the capacitor of the converter rather than, as in the prior art, monitoring current flow in the secondary.

The invention is applied to a converter that includes an input control circuit which, when signalled, connects a low-voltage power supply to the primary of the converter transformer through a transistor switch for only a predetermined interval of time termed the T1 interval. The current that flows in the primary during the T1 interval establishes a magnetic field that stores energy derived from the power supply. Interruption of the current flow in the primary at the end of the T1 interval causes the magnetic field to collapse inducing current flow in the secondary and transferring energy from the field to the capacitor. Sensor means according to the present invention detects the instant that the energy transfer process is complete and signals the input control circuit to repeat the cycle for further increasing the voltage across the capacitor. Current thus flows in the secondary during the interval of time between interruption of current in the primary and signalling of the input control circuit, such interval being termed the T2 interval which decreases as the capacitor is charged.

The sensor means of the present invention includes a first, or voltage, sensor inductively coupled to the magnetic field of the transformer for developing what is termed herein, a sensed voltage having a first level during the time the field is collapsing, and a second level after the field collapses to zero. The magnitude of the first level of the sensed voltage is dependent on the turns ratio between the secondary of the transformer and the first sensor, and on the capacitor voltage at the instant current begins to flow in the secondary. The greater the capacitor voltage, the greater the difference between the first and second levels.

The collapse of the magnetic field to zero terminates current flow in the secondary and defines a sharp break point, or discontinuity, between the first and second levels of the sensed voltage. After the voltage on the capacitor exceeds a few volts, the change in the sensed voltage at the break point (i.e., the difference between the first and second levels) is detectable, for example, by a comparator set at a level between the first and second levels, the output of the comparator signalling the input circuit.

By detecting a point at which the magnetic field in the transformer goes to zero, rather than the point at which the flow of current in the secondary reaches zero, the turn-on point of the transistor switch of the input control circuit can be controlled more precisely. As a consequence, the efficiency of the converter according to the present invention is improved over that of the prior art.

The arrangement described above is effective in controlling the turn-on of the transistor switch only after the voltage on the capacitor has reached a predetermined value. Before this occurs (e.g., when converter operation begins under the condition that the capacitor is totally discharged), the first sensor is incapable of controlling turn-on of the transistor switch because no significant change occurs in the sensed voltage at the break point. Consequently, the invention also provides a second, or current, sensor that directly monitors the current in the secondary and produces an output when the last mentioned current flow decreases to a predetermined level.

The invention also includes an OR-gate type device responsive to the outputs of either of the current and the voltage sensors for turning on the power transistor when either of these sensors produces an output. That is to say, if the converter begins operation with no charge on the capacitor, the current sensor in the secondary is effective to control the initial operation of the converter in a conventional manner. After the voltage on the capacitor reaches a predetermined level, or if operation of the converter is initiated when the voltage on the capacitor exceeds the predetermined level (the latter situation arising when flash exposures are made in relatively rapid sequence or a given flash is quenched), the voltage sensor controls turn-on of the transistor switch.

In the preferred embodiment, the primary of the transformer constitutes the voltage sensor, the sensed voltage being the voltage across the transistor switch. In addition, the state of a flip-flop driven by a free running timer controls the conductive state of the transistor switch. The period of the timer determines the "on" time of the transistor switch. When the flip-flop changes state disabling the transistor switch and interrupting current in the primary, the flip-flop is disabled until either the sensed current in the secondary reaches substantially zero under the condition that the voltage on the capacitor is below a threshold, or the break point in the sensed voltage in the primary is detected under the condition that the voltage on the capacitor exceeds the threshold. After the flip-flop is enabled, the next change of state of the timer turns-on the transistor switch and the cycle repeats.

The converter according to the present invention has no inherent regulation; and if not otherwise controlled, the voltage on the capacitor will build up without limit until component failure occurs. Regulation is introduced in the converter according to the present invention by providing a comparator for producing a signal in response to detection of a voltage on the capacitor which exceeds a predetermined reference value associated with the rated voltage of the capacitor, the last mentioned signal serving to disable the flip-flop driven by the free running timer, and terminating operation of the converter until the voltage on the capacitor decreases below its rated value.

Finally, the present invention provides an integrated circuit that controls the operation of the converter.

BRIEF DESCRIPTION OF DRAWINGS

Embodiments of the present invention are shown in the accompanying drawings wherein.

BEST MODE FOR CARRYING OUT THE INVENTION

Figure 1:
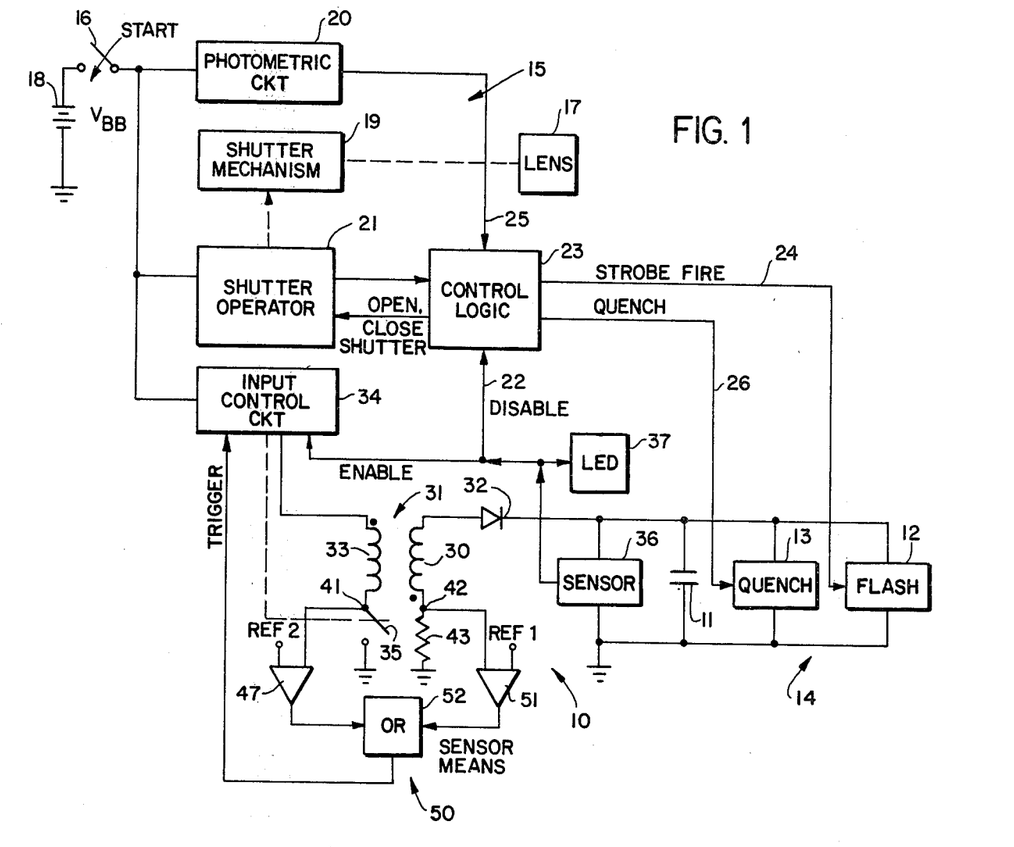
FIG. 1 is a block diagram of a DC-to-DC converter according to the present invention.

Referring now to FIG. 1 of the drawings, reference numeral 10 designates a DC-to-DC converter for charging storage capacitor 11 that supplies energy to flash tube 12 and quench tube 13 which are part of flash attachment 14 connected to camera 15. When start switch 16 is closed by a photographer wishing to take a photograph through lens 17, low-voltage power supply 18, which may be carried in a film pack located behind shutter mechanism 19 of the camera, will supply power to photometric circuit 20, shutter operator 21 of the camera, and converter 10. If capacitor 11 is not charged to its rated value when switch 16 is closed, converter 10, in a manner described below, will produce a disable signal in line 22 applied to control logic circuit 23 of the camera for the purpose of preventing operation of shutter operator 21. When capacitor 11 is charged to its rated voltage, the disable signal is removed from line 22, and logic 23 is effective to cause shutter operator 21 to initiate an exposure cycle by initiating movement of shutter mechanism 19 which may be a scanning shutter whose aperture increases with time.

Simultaneously with "first light" through the shutter mechanism, photometric circuit 20, in a conventional manner, becomes effective to begin integration of the light from the scene being photographed. Depending upon the design involved, control logic circuit 23 generates a strobe fire signal in line 24 when the aperture reaches a predetermined size, such signal triggering flash 12 and enabling capacitor 11 to begin discharging into the flash tube which begins to produce a sharp burst of light. Photometric circuit 20 is effective, beginning with "first light", to integrate light passing through shutter mechanism 19, to determine when the exposure is adequate and to provide a signal in line 25 which causes control logic circuit 23 to develop a quench signal in line 26 thereby firing quench tube 13 and terminating the light output of flash tube 12. Again, depending upon the design involved, the quench signal may be accompanied by a concurrent signal from logic 23 which causes shutter operator 21 to close shutter mechanism 19.

As seen in FIG. 1, converter 10 provides for the charging of capacitor 11 connected via diode 32 to secondary 30 of step-up transformer 31. Primary 33 of transformer 31 is connected to power supply 18 through input control circuit 34. Signalling this circuit closes switch 35 serially connected to the primary whereby current from power supply 18 flows through the primary establishing a magnetic field wherein energy from the power supply is stored. After a predetermined interval of time, circuit 34 causes switch 35 to open thereby disconnecting the primary from the power supply and interrupting the current flow therein. Interruption of the current flow in the primary causes the magnetic field to collapse inducing current flow in secondary 30 which passes through diode 32 transferring the energy in the field to capacitor 11 which is charged thereby. The voltage on capacitor 11 is sensed by sensor 36 which causes LED 37 to be illuminated as long as the voltage across capacitor 11 is less than a threshold. The signal developed by sensor 36 acts to disable logic 23 and to enable circuit 34.

When start switch 16 is closed, and the voltage on capacitor 11 is less than the threshold of sensor 36, the latter will enable control circuit 34 which is signalled thereby closing switch 35 for a predetermined time interval referred to hereinafter as the T1 interval. The closure of switch 35 applies a step-function voltage to primary 33 which causes a ramp-like current to flow therein because of the inductive nature of the primary. On closure of switch 35, the voltage at node 41 drops to essentially ground potential where it remains during interval T1. At the end of this interval, the current in the primary will have reached a predetermined level; and circuit 34 opens switch 35 interrupting current flow in primary 33. This interruption returns the current in the primary to zero in a very short time collasping the magnetic field and inducing current flow in the secondary which passes through diode 32 into capacitor 11, as the voltage at node 41 returns, after a very short spike, to the power supply voltage. The initial flow of current in the secondary rapidly drops the voltage at node 42 below ground potential to a value that depends on the peak current in the primary, the turns-ratio of the transformer, and the size of resistor 43.

Figure 2:
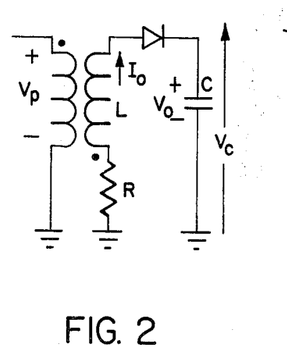
FIG. 2 is a schematic diagram of a transformer of a converter having a secondary constituting an R-L-C circuit.
Figure 3:
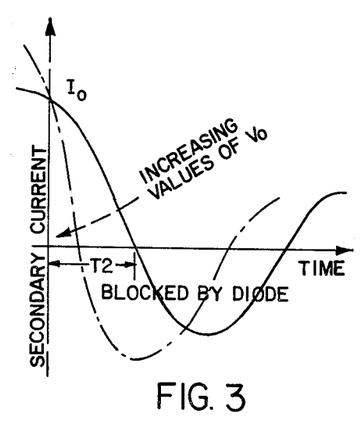
FIG. 3 is a graph showing the theoretical time variation of secondary current following interruption of primary current.

It can be shown analytically that an R-L-C circuit, such as shown in FIG. 2, without the diode and with an initial current $I_o$ flowing in the inductor at time zero will produce an exponentially damped sinusoidal current (FIG. 3) whose amplitude is directly proportional to the initial voltage $V_o$ on the capacitor at time zero. The frequency of the sinusoid is a function of the component values and the sinusoid has a phase angle that is essentially directly proportional to the voltage $V_o$.

The presence of a diode in this circuit will prevent ringing, and block reverse flow of current in the secondary which decreases from $I_o$ to zero in an interval of time termed, hereinafter, T2 determined by the phase angle of the sinusoid. Because the phase angle increases directly as the voltage $V_o$, the interval T2 decreases as the voltage on the capacitor increases.

In the interval T2, the voltage at node 42 will start at an initial negative value and increase toward ground potential. The end of interval T2 occurs when current flow in the secondary ceases, or the voltage at node 42 returns to ground potential. When the voltage on the capacitor is less than a threshold, the voltage at node 42 is used to establish the T2 interval. Accordingly, sensor means 50 includes a current sensor 51 for determining the point at which the voltage at node 42 reaches essentially ground potential causing OR-gate 52 to produce an output that signals circuit 34 into another cycle of operation. The utilization of a current sensor in the secondary of the transformer of the converter is conventional and is similar to the techniques utilized in the two patents referred to above.

As indicated above, the basic problem with this approach is sensing the precise point at which the current in the secondary reaches zero, particularly when noise is present in the ground line. To overcome this problem, the present invention utilizes a voltage sensor inductively coupled to the secondary for monitoring the magnetic field and determining the instant at which the field collapses to zero and thus determining the point at which current flow in the secondary reaches zero. This arrangement is effective only under the condition that the pre-existing charge on the capacitor exceeds a threshold at the instant the field begins to collapse. Thus, a two stage control is provided by the present invention: while the voltage on the capacitor is below a threshold, a conventional current sensor is used to determine the cessation of secondary current and signal the control unit; and thereafter, a voltage sensor according to the present invention monitors the magnetic field and signals the control unit when the field collapses to zero.

Figure 4:
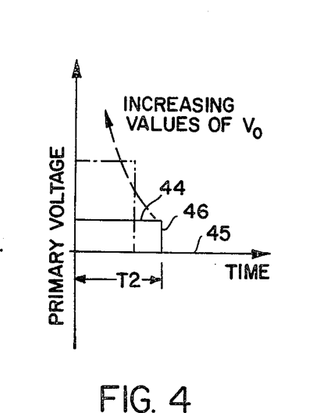
FIG. 4 is a graph showing variations in open circuit primary voltage due to current flowing in the secondary when an initial voltage exists across the capacitor.

An understanding of the operation of the voltage sensor of the present invention is obtained by reference to FIGS. 2 and 4. FIG. 2 shows the condition of an R-L-C circuit at time zero, i.e., at the instant current in the primary is interrupted and the magnetic field in the transformer begins to collapse. The initial current in the secondary is $I_o$ and the initial charge on the capacitor is $V_o$. As indicated previously, the current in the secondary drops to zero, following a sinusoidal path, in a time T2 that decreases with increasing values of $V_o$. However, as current flows in the secondary, transformer action occurs between the primary and secondary. That is to say, during time T2, a voltage $V_p$ appears across the primary due to the voltage $V_o$ on the capacitor, the voltage $V_p$ being proportional to the primary-to-secondary turns-ratio and the magnitude of the capacitor voltage. The voltage $V_p$ exists, however, only during the time current flows in the secondary. Thus, as seen in FIG. 4, the voltage across the primary has a first level indicated by reference numeral 44 during the time current flows in the secondary (i.e., during collapse of the magnetic field) and a second level 45 after the field collapses to zero. A break point 46 connects the two levels at precisely the instant the field collapses to zero; and the difference between levels 44 and 45 is determined solely by capacitor voltage $V_o$. If this voltage is zero, or very close to zero (i.e., the capacitor is uncharged or very nearly so), levels 44 and 45 are essentially the same and the break point is practically unidentifiable. However, after the voltage $V_o$ reaches a threshold that depends on the turns-ratio involved, levels 44 and 45 will begin to be significantly different. In such case, the instant at which the magnetic field collapses to zero (i.e., cessation of secondary current flow) can be determined by monitoring the voltages on the primary with a comparator set to a reference somewhat above level 45. Thus, as soon as the voltage on the capacitor reaches a value that produces a voltage in the primary exceeding the reference, the next and all subsequent cycles of charging of the capacitor can be controlled by the output of the comparator.

Returning now to FIG. 1, comparator 47 connected to node 41 produces an output that signals circuit 34 in each cycle of operation following a cycle in which the voltage on capacitor 11 reaches a value at which the voltage at node 41 exceeds reference REF2 during the time current flows in the secondary.

Because the break point of the voltage at node 41, caused by the termination of current flow in the secondary, is rather sharply defined, an accurate indication is obtained of the precise moment at which the energy transfer process from the secondary to the capacitor has been completed notwithstanding the presence of noise in the ground line that may interfere with the operation of the current sensor in the secondary of the transformer. In this manner, the completion of the energy transfer process is accurately determined, and the efficiency and reliability of the converter are increased.

Figure 5:
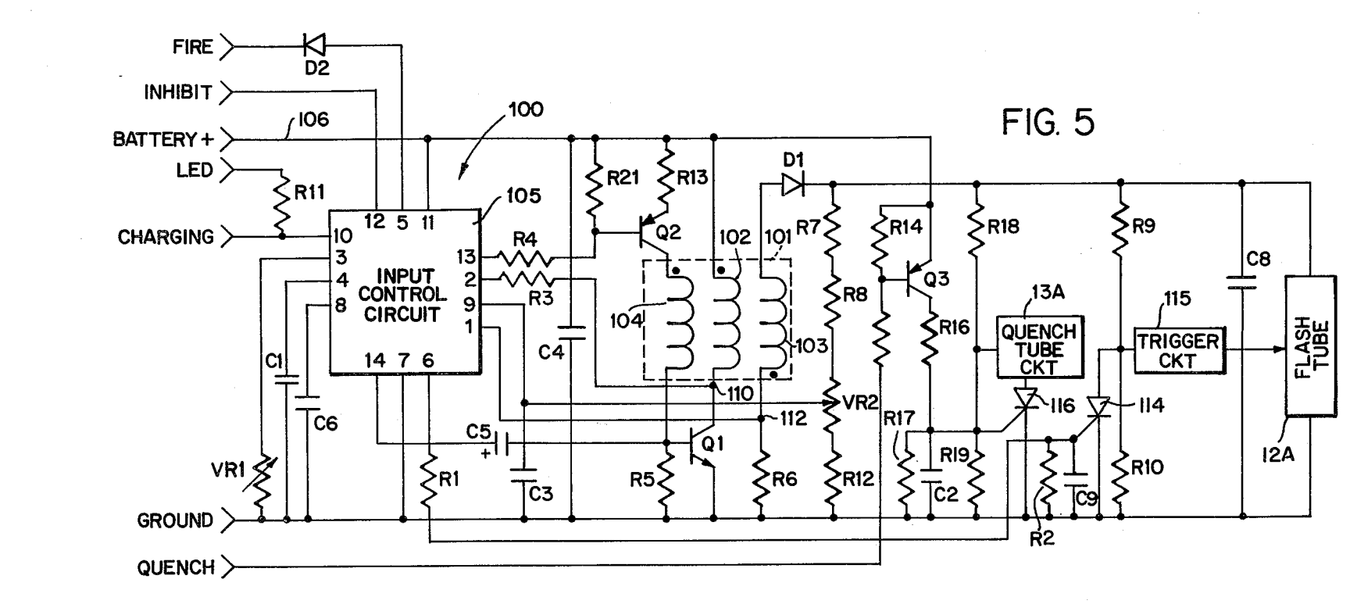
FIG. 5 is a circuit diagram of the converter according to the present invention showing details of the converter.

A specific embodiment of the converter illustrated schematically by reference numeral 10 in FIG. 1, is shown in FIG. 5 and designated by reference numeral 100. Converter 100 comprises: transformer 101 having primary winding 102, secondary winding 103, and tertiary winding 104; transistor Q1 operating as a switch; transistor Q2 operating as the driver for the switch; integrated circuit 105 operating as an input control circuit for controlling the operation of the driver and switch; and associated components which cooperate with the integrated circuit. In operation, the closure of a starting switch (not shown in FIG. 5) applies a power supply in the form of a battery to bus 106 which powers the integrated circuit and the various transistors and other components of the converter.

Figure 6:
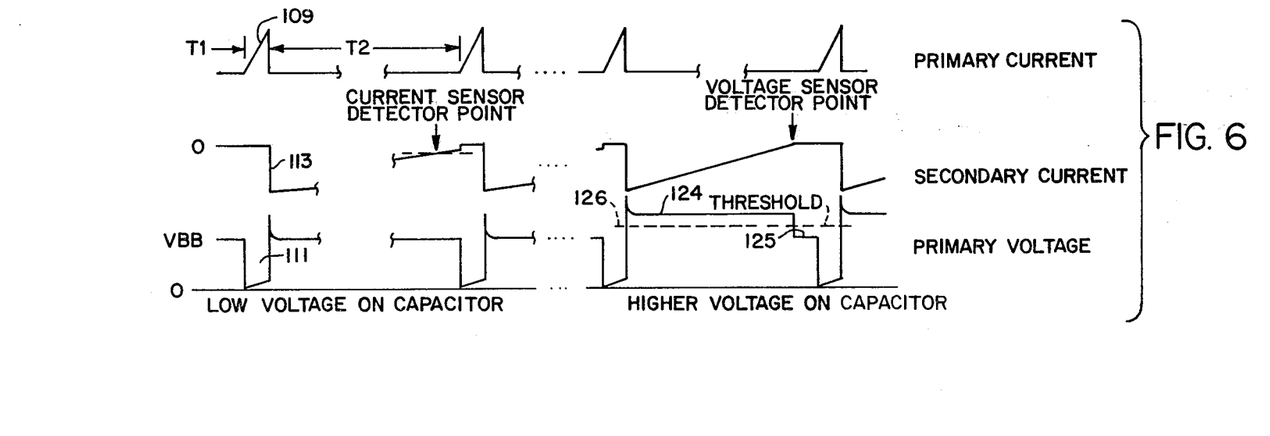
FIG. 6 shows two sets of waveforms, under two different conditions of initial voltage on the capacitor at diffent locations in the circuit of FIG. 5.
Figure 7:
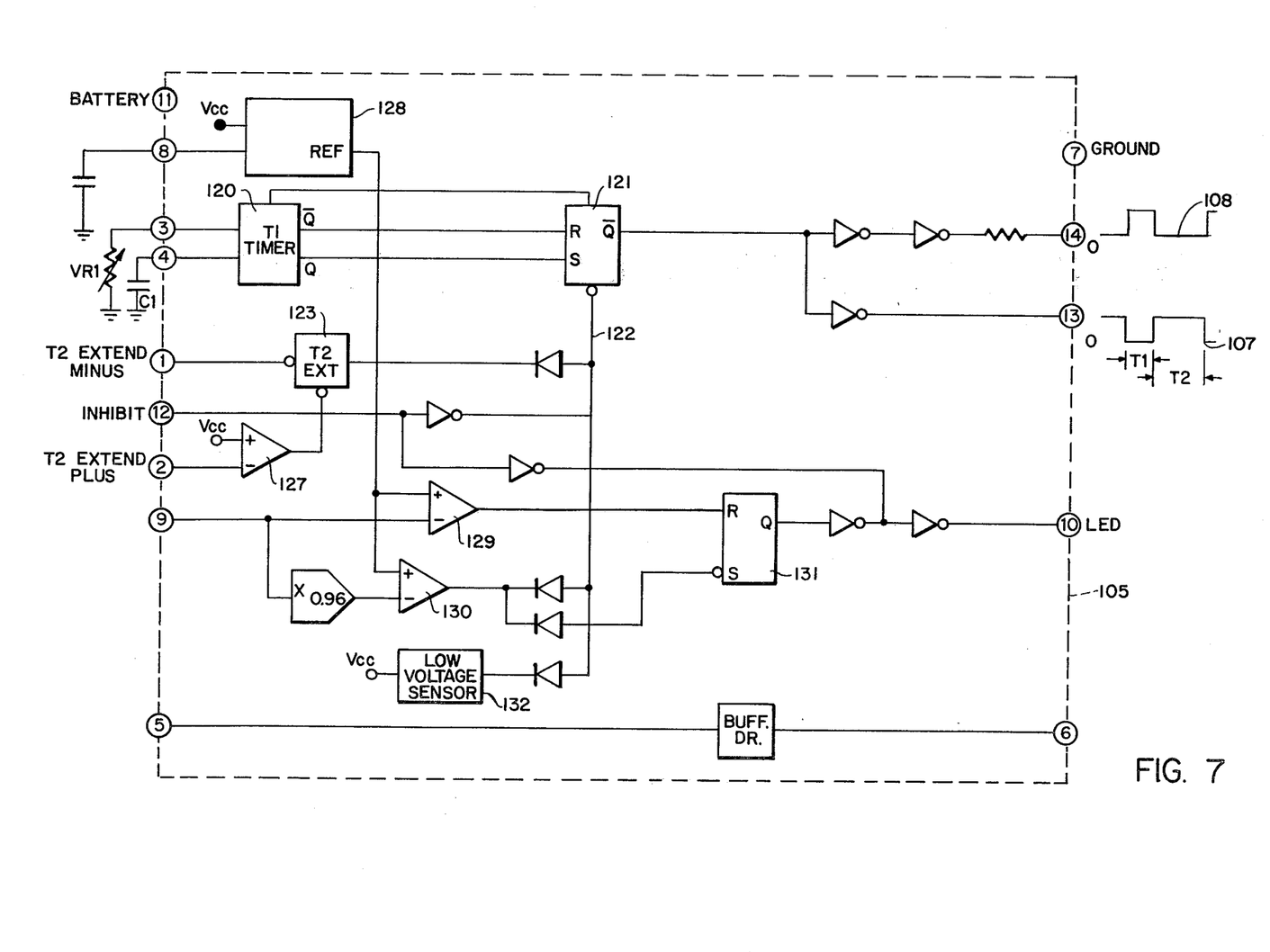
FIG. 7 is a block diagram of the integrated circuit shown in FIG. 5.

The integrated circuit, in response to the application of power to pin 11, produces complementary outputs at pin 13 and 14 having shapes shown by reference numerals 107 and 108, respectively, in FIG. 7. That is to say, during time interval T1, the voltage at pin 13 goes low while during the subsequent time interval T2, the voltage remains at a high potential. As a consequence of this voltage at pin 13, transistor Q2 is turned on at the beginning of interval T1 and remains on during this interval, allowing collector current from this transistor to flow through tertiary winding 104 of transformer 101. The collector current of transistor Q2 supplies base current to switch Q1 which is turned on and driven into saturation causing collector current to flow through primary winding 102 in the transformer. The step function application of voltage to primary 102 results in a ramp type current flow through the primary in the manner indicated by current pulse 109 in FIG. 6.

At the end of the interval of T1, the voltage at pin 13 returns to a high potential while the voltage on pin 14 goes to a lower potential from a higher potential. When pin 13 goes to a high potential, the emitter-base junction of Q2 is reverse biased cutting off this transistor and halting base current drive to Q1. When pin 14 goes to a low potential, capacitor C5, which had been charged in the direction indicated in FIG. 5, couples a negative spike to the base of Q1 reverse biasing its emitter-base junction and rapidly turning off this transistor. Thus, current flowing through the primary winding of the transformer is rapidly interrupted at the end of interval T1 with the result that the magnetic field of the transformer collapses inducing a flow of current in secondary 103, this current flow transferring the energy in the magnetic field to storage capacitor C8 through diode D1. Preferably, the turns-ratio between the secondary and the primary of transistor 101 is about 20:1 with the result that the maximum current flowing in the secondary at the instant of cutoff of primary current is approximately 1/20th of the maximum current flowing in the primary at the instant it is interrupted. In the device illustrated in FIG. 5, the interval T1 is approximately 50 usec, the inductance of the primary is about 50 uH, and the maximum current flow to the primary is approximately 6A. As a consequence, the peak current that flows in the secondary at the beginning of interval T2 is approximately 300 mA.

Assuming the storage capacitor is completely discharged when the battery voltage is applied to the converter, the voltage at node 110 in the primary of the transformer goes from battery voltage down to approximately ground voltage as transistor Q1 saturates as indicated by pulse 111 in FIG. 6. The voltage at node 110 remains at substantially ground potential during the time interval T1. At the end of this time interval, current through the primary is interrupted and current flows to the secondary causing the voltage at node 112 to drop from ground potential to a negative value as indicated by curve 113 in FIG. 6, the value of the initial drop in voltage being dependent upon the magnitude of the initial current flowing in the secondary and the magnitude of resistor R6. In the device as illustrated in FIG. 5, resistor R6 is 12 ohms so that a peak current of 300 mA produces a 3.6 V drop across this resistor.

In a manner described in detail in connection with FIG. 7, integrated circuit 105 senses completion of the transfer of energy in the magnetic field of the transformer to the storage capacitor, such transfer occurring during the time interval T2, and then repeats the cycle described above.

Eventually, the voltage on the storage capacitor C8 reaches the rated value, which is applied to the integrated circuit at pin 9, and operation of the converter is terminated in the manner described below. During the time that the storage capacitor is being charged, pin 10 of the input control circuit has an output that is applied to an LED, preferably located in the viewfinder of the camera, indicating to the user that the capacitor is being charged and exposure cannot be made as yet. Pin 10 also provides a disable signal which prevents the exposure control apparatus of the camera from initiating an exposure cycle.

When the voltage on the storage capacitor reaches its rated value, the LED is extinguished and the disable signal is removed from pin 10. Exposure is now initiated by the exposure control apparatus of the camera and a fire signal is eventually received at pin 5 of the integrated circuit and transferred to pin 6 for the purpose of triggering SCR 114 which conducts thereby causing trigger circuit 115 to fire flash 12A. The photometric circuit (not shown in FIG. 5) eventually provides a quench signal to transistor Q3 which conducts thereby causing SCR 116 to conduct firing quench tube 13A and terminating the light output from tube 12A.

Details of integrated circuit 105 are shown in FIG. 7. The integrated circuit contains free running oscillator 120 for producing a pulse train having a period determined by the setting of potentiometer VR1 and the value of capacitor C1 (FIG. 5). In the particular device shown in FIG. 5, the values of resistance and capacitance provide a time interval T1. Timer 120 drives set/reset flip-flop 121 whose output is applied to pins 13, 14 of the integrated circuit such that the outputs are complementary. As is readily understood, timer 120 and flip-flop 121 are interconnected in a closed-loop manner such that the actual output pulse train from timer 120 has a period of T1+T2 and the timer 120 is inhibited during the T2 period.

After the first positive going signal produced by timer 120 occurs, flip-flop 121 is disabled by the signal appearing in line 122 which is connected to the output of OR-gate 123. Pin 1 supplies an input to this gate, such input being the voltage across resistor R6 in the secondary of the transformer. Thus, at the end of a time interval T1, the voltage at pin 1 is negative and remains negative during interval T2 within which current flows in the secondary as the energy transfer process takes place. When the voltage on resistor R6 reaches a predetermined value, just slightly below ground potential, say −0.18 volts, OR-gate 123 is effective to remove the disable signal from line 122 such that flip-flop 121 then provides a positive-going output from timer 120. The cycle then repeats.

After the voltage on the storage capacitor reaches a threshold, say 20-25 volts, the voltage at node 110 will remain at a level above the battery voltage during time interval T2 as indicated by reference numeral 124 in FIG. 6. Upon completion of the energy transfer process, the voltage at node 110 rapidly drops to a lower level 125, namely the battery voltage and will remain at this level until current once again flows in the primary. As can be seen in FIG. 6, a termination of the energy transfer process is signalled by a drop in voltage at node 112 permitting the voltage at node 110 to be compared with reference level 126 for the purpose of detecting the end of the energy transfer process. This is achieved by comparator 127 (FIG. 7) to which reference voltage Vcc is applied, the reference voltage being level 126 developed by reference voltage generator 128 in the integrated circuit.

The reference voltage Vcc is selected just above the battery voltage with the result that the end of the energy transfer process can be detected by monitoring the voltage at node 110 after the voltage on the storage capacitor reaches a threshold, which when transformed to the primary by the turns ratio, corresponds to threshold 126. The output of comparator 127 is also applied to OR-gate 123 with the result that the disabling signal in line 122 is removed from flip-flop 121 at the precise instant that the energy transfer process is completed as detected by the voltage at node 110. This situation is indicated in the right-hand set of curves in FIG. 6.

Figure 8:
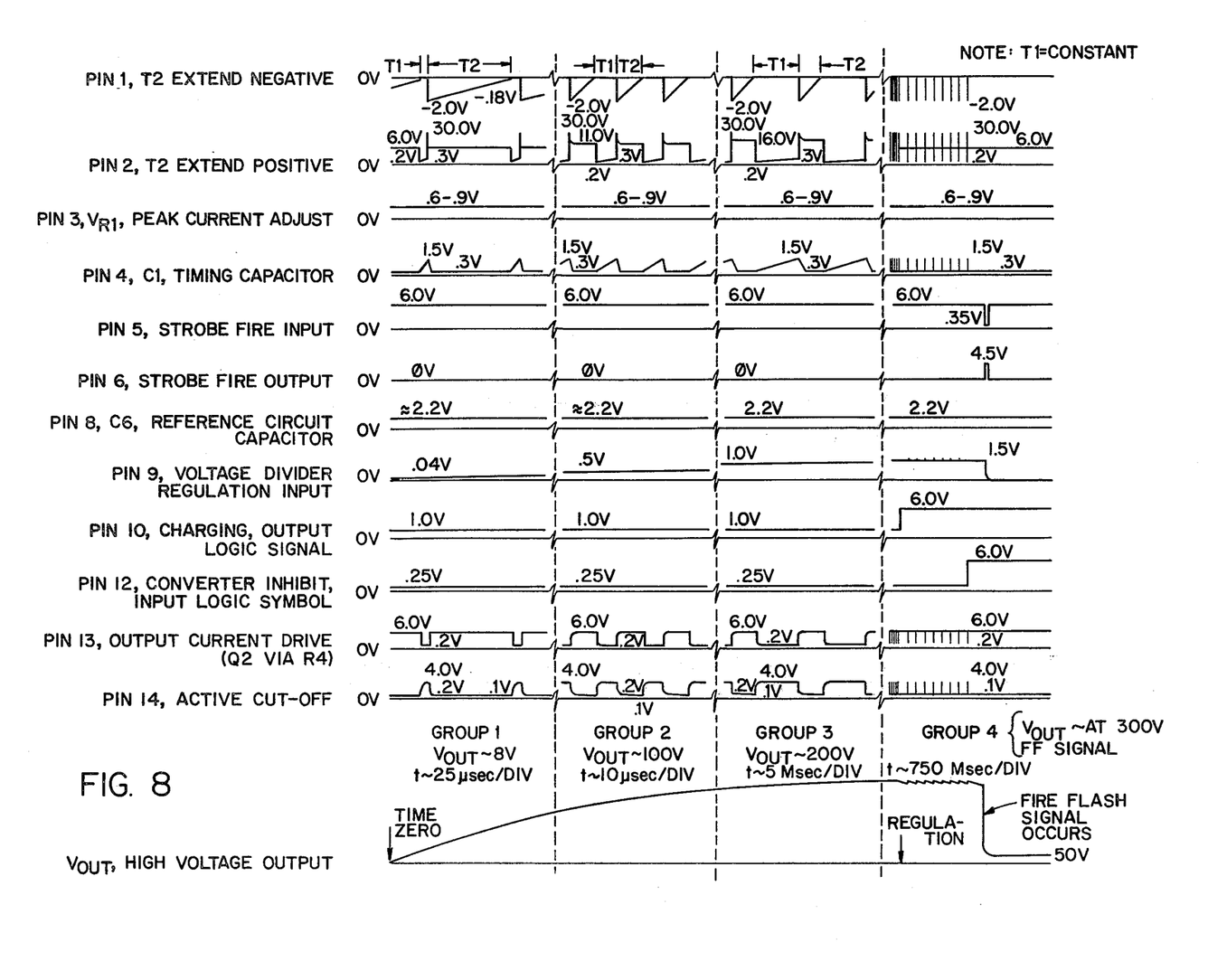
FIG. 8 shows waveforms at various pins of the circuit of FIG. 7.

FIG. 8 shows waveforms at the various pins of the integrated circuit during different stages of charging of the storage capacitor. Note that the time period T2 decreases as the voltage on the storage capacitor builds-up, and that the voltage at node 110 (pin 2) increases with increases in voltage on the storage capacitor.

Because the converter shown in FIG. 5 is inherently incapable of regulating itself, a regulating system must be provided in order to prevent the voltage on the storage capacitor from reaching higher than the desired value. Regulation is achieved by the voltage divider R7, R8, R12, and VR2 in combination with the circuitry associated with pin 9 of the integrated circuit (FIG. 7). Specifically, when the voltage on pin 9 is below a level representing the rated voltage on the storage capacitor, comparator 129 (FIG. 7) will have an output that resets flip-flop 131, thereby providing an output at pin 10 which, as indicated previously, illuminates an LED in the viewfinder of the camera and provides an inhibiting signal that prevents the exposure control mechanism of the camera from being operated.

When the voltage at pin 9 reaches a representation of the rated capacitor voltage, comparator 129 will no longer have an output but the state of flip-flop 131 will remain the same. However, when the voltage on the storage capacitor reaches about 4 percent more than its rated value, comparator 130 will have an output which will set flip-flop 131 thereby removing the signal from pin 10, extinguishing the LED, and enabling the exposure control mechanism of the camera. In addition to these functions, an output from comparator 130 disables flip-flop 121 and prevents further operation of the converter.

Finally, the integrated circuit provides for the disabling of flip-flop 121 in the event that the battery voltage drops to a value which prevents circuit 128 from generating the threshold voltage Vcc which is necessary for the voltage sensor 127 to operate properly. As shown in FIG. 7, low voltage sensor 132 has the voltage Vcc applied to it so that, in the event the threshold voltage drops below some limit, operation of flip-flop 121 is terminated.

While this disclosure deals in detail with a voltage sensor connected across the transistor switch of a converter, the invention has broader application. For example, an auxiliary coil can be inductively coupled to the transformer and the sensed voltage taken across this coil.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. A DC-to-DC converter for charging a capacitor from a low-level DC power supply comprising:
   a transformer having a secondary winding for connection to the capacitor, and having a primary winding;
   an input control circuit for selectively connecting said primary winding to the DC power supply for a predetermined time interval in response to an input signal thereto whereby current flows in said primary winding establishing a magnetic field that stores energy and whereby at the end of said predetermined time interval the current flow in said primary winding is interrupted to cause the magnetic field to start to collapse and induce current to flow in said secondary winding so as to transfer energy from the field to the capacitor; and
   first sensor means responsive to a variation in voltage indicative of the collapse of the magnetic field in said primary winding subsequent to the interruption of the current flow in said primary winding by said input control circuit for providing a signal having a discontinuity at the instant the magnetic field collapses to zero and for signalling said input control circuit when the discontinuity occurs so that said input control circuit can again connect the power supply to said primary winding for said predetermined time.

2. A converter of claim 1 including second sensor means for monitoring current flow in said secondary winding subsequent to the interruption of the current flow in said primary winding for producing an output signal when the current flow in said secondary winding reaches substantially zero, said output signal from said second sensing means also operating to signal said control circuit so that said control circuit can again connect the power supply to said primary winding for said predetermined time.

3. A converter according to claim 1 or 2 wherein said first sensor means is effective only under the condition that the pre-existing voltage across the capacitor exceeds a threshold.

4. The converter according to claim 3 wherein said voltage sensed by said first sensor means has a first level during collapse of the field and a second level after the field collapses to zero and wherein said first sensor means includes a level detector for producing the output signal from said first sensor means when the sensed voltage reaches a threshold between said first and second levels.

5. A converter according to claim 4 wherein said input control circuit includes a switch in series with said primary winding for connecting said primary winding to the power supply when said switch is closed wherein said switch is in the form of a power transistor whose collector is connected to one side of said primary winding and said input control circuit includes driver means for controlling base current to said power transistor.

6. A converter according to claim 5 wherein said input control circuit includes a tertiary winding on said transformer inductively coupled to said primary and secondary, the sense of said tertiary winding being the same as the sense of said primary, said tertiary winding being connected between said driver means and the base of said power transistor whereby base current supplied to said power transistor adds to the energy stored in the magnetic field due to current flow in said primary.

7. A converter according to claim 6 wherein said level detector is a first comparator for comparing the voltage across said power transistor with a first reference voltage for producing an output when the voltage across said power transistor drops below the first reference voltage.

8. A converter according to claim 7 wherein said driver means comprises a driver transistor whose output is connected to said tertiary winding, and said input control circuit includes means for selectively operating said driver transistor.

9. A converter according to claim 8 wherein said means for selectively operating said driver transistor includes a free-running timer with a period much shorter than the time that current flows in said secondary of said transformer when the voltage on the capacitor is approximately rated value, a set/reset flip-flop driven by the timer for forwardly biasing said driver transistor when said flip-flop has a predetermined state, and means for disabling said flip-flop after it changes from its predetermined state until said first sensor produces an output.

10. A converter according to claim 9 including a capacitor voltage sensor for producing a control voltage proportional to the voltage on the capacitor, and a second comparator for comparing the control voltage with a second reference voltage for producing a signal when the control voltage exceeds said second reference voltage by a predetermined amount.

11. A converter according to claim 10 wherein said flip-flop is disabled by the signal produced by said second comparator.

12. A converter according to claim 10 including a third comparator for producing a signal as long as the control voltage does not excees said second reference voltage.

13. A converter according to claim 12 including a visual indicator for indicating that the capacitor is being charged, said indicator being turned on in response to the signal from said third comparator and turned off in response to the signal from said second comparator.

14. A converter according to claim 12 including a control flip-flop whose states are determined by the signals from said second and third comparators, and a visual indicator operated by said control flip-flop.

15. A converter according to claim 11 wherein said control flip-flop is disabled when said second reference voltage drops below a predetermined value.

* * * * *